United States Patent [19]

Stanton

[11] Patent Number: 4,730,398

[45] Date of Patent: Mar. 15, 1988

[54] PRELIMINARY RECORDING ACTIVITY BY GUIDE AND POINT

[76] Inventor: Carl A. Stanton, Roff Hill Rd., Pulteney, N.Y. 14874

[21] Appl. No.: 210,751

[22] Filed: Feb. 17, 1981

[51] Int. Cl.$^4$ .............................................. G01C 3/00
[52] U.S. Cl. ...................................... 33/1 K; 33/1 B; 33/562
[58] Field of Search ............ 33/1 B, 1 G, 1 K, 1 CC, 33/174 G, 184.5, 189, 12, 13, 562, 565

[56] References Cited

U.S. PATENT DOCUMENTS

| | | | |
|---|---|---|---|
| 464,359 | 12/1891 | Hagan | 33/1 K |
| 1,965,337 | 7/1934 | Geyer | 33/1 B |
| 3,660,903 | 5/1972 | Caperton, Jr. | 33/1 K |
| 3,771,231 | 11/1973 | Kemp | 33/189 |
| 3,795,053 | 3/1974 | Burke | 33/1 B |
| 4,171,573 | 10/1979 | Picciotto | 33/1 B |

*Primary Examiner*—Willis Little

[57] ABSTRACT

A preplanned system entitled "preliminary recording activity by guide and point" is a topmost sheet and also a perforating point for perforating the said topmost sheet and going onto an underlying sheet to process, symbolize, chart, map, layout, draw, write, and record on the said underlying sheet; this system invention has replaced scale and ruler with detachable, disposable said topmost sheet, said perforating point and straight edge; this invention has also brought the rough, replimiminary recording phase closer to and has substituted part of the activity for finishing the processed said underlying sheet and thereby also replaced all previously used marks and their removal for all correct activity on the said underlying sheet transferring all these temporarily used marks onto the detachable, disposable said topmost sheet for a cleaner processed and quickly finished said underlying sheet; the novelty is the positioning, perforation point hole indicators made by the said perforating point through the said topmost sheet on which the preliminary activity is accomplished and onto, into, and through the recording said underlying sheet, whatever required, for whatever recording is desired by the user of the said topmost sheet, the said perforating point, and their accompanying activity; the processed substrate is then finished with whatever means is required having the said system means having a function for having information flow from said topmost sheet to the said underlying sheet.

5 Claims, 2 Drawing Figures

PRELIMINARY RECORDING ACTIVITY BY GUIDE AND POINT

BACKGROUND AND FIELD OF INVENTION

This invention is called a preliminary recording activity by guide and point which is an invention on the prior art of processing, symbolizing, charting, mapping, layout, drawing, writing, and recording on a substrate, but is not limited to these applications.

DESCRIPTION OF PRIOR ART

Heretofore, processing, symbolizing, charting, mapping, drawing, layout, writing, and recording activities and more than these activities occurred on a substrate upon which the result of these activities would rest; upon this substrate would be added and deposited media, or the substrate would be modified as for example by scratches or scribe marks to result in the processed substrate; the length, width, height, depth of marking would be determined either by calculation, speculation, decision, ratio, and/or subsequent scaling; the approximately sequential stages of the prior art would be (1) rough sketch, (2) substrate media altering by but not limited to deposit or rearranging, (3) removal and obliteration of guides, (4) permanentizing, (5) correction of finished activities; an alternative would be an overlay cutout or template cutout on the substrate around and through which additions, deposits, modifications as scratches and/or scribe marks of the prior art would be entered on the substrate through the opening and outline already in existence; in summary, most of the prior art results of the marking activities would occur on the substrate as well as all of the contributory, intermediate and final activities would occur on the substrate.

SUMMARY OF THE INVENTION

Objects and Advantages

Accordingly, the objects and advantages of the preliminary recording activity by guide and point invention are to have a system for recording graphic information by preliminary an underlying sheet substrate activity accomplished once, precisely, without erasures, and by perforation point holes; to have the said system have the preliminary rough sketch prepared on a disposable topmost sheet; to replace the scales and rulers by the said disposable topmost sheet DC-GUIDE; for example: a previously processed sheet can be replaced by a cleaner processed said underlying sheet; most erasures are eliminated for all correct work; most erasures for incorrect work are replaced by a smoothing of the said underlying sheet for all the incorrect point holes; all erasures of guide lines are eliminated by guidepoints and guidelines, a grid pattern, preplaced on the preplanned said topmost sheet as well as all of the notes and marks previously required during planning and guiding. The advantages arising from the above objects are less cost required for processing, symbolizing, charting, mapping, layout, drawing, writing, and recording but not limited to these activities; precision is increased on the said underlying sheet by said perforation point holes for the necessary position indications; after the preliminary activity, permanentizing of the said underlying sheet recording can be accomplished directly, the said points can be connected, if required; less time required from start to finish of the said underlying sheet; additional advantages are elimination of temporary marks from the said underlying sheet which are now placed on the said topmost sheet; precision is increased from the variable width of a pencil's sharp-to-dull point to the precision of an almost non-wearing, non-changing perforation point as a needle or laser making a said perforation point hole; the said disposable topmost sheet also acts as a protective cover for the said underlying sheet during the processing activities; the said disposable topmost sheet can also be a guiding, marking, catch-all, note recording surface, a system means having a function for having information flow from said topmost sheet to the said underlying sheet, English measurement system to Metric measurement system facilitator; less experience is required to produce quality processing, symbolizing, charting, mapping, layout, drawing, writing, and recording or whatever system processing activity is utilizing this invention.

DESCRIPTION OF THE PREFERRED STRUCTURAL EMBODIMENT

Figure 1:
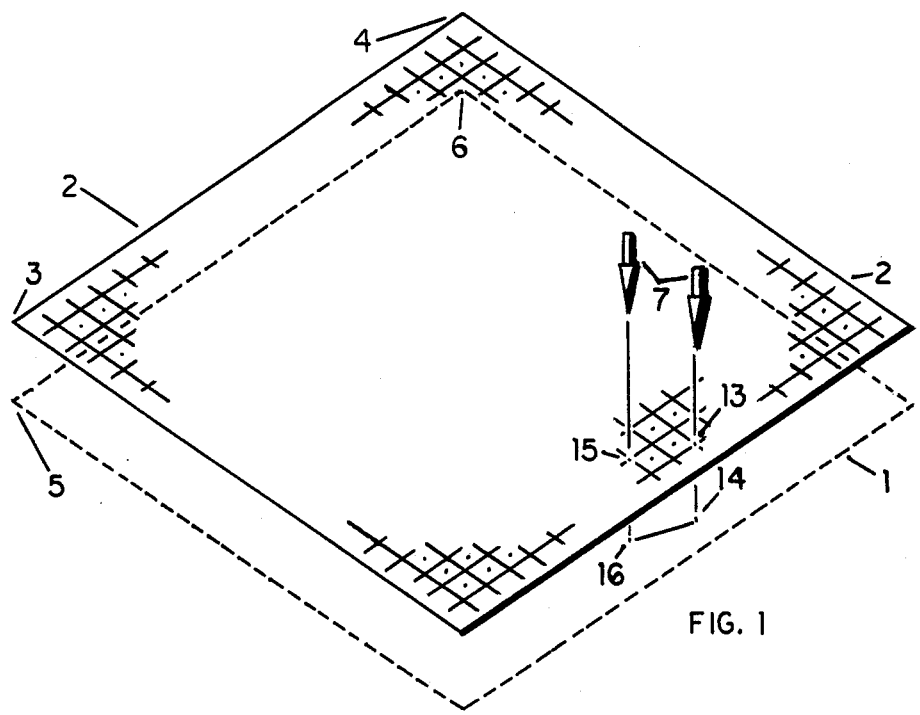
FIG. 1 illustrates an exploded isometric view of a typical invention arrangement for a two-dimensional preliminary recording activity by guide and point.

The preferred structural embodiment for the preliminary recording activity by guide and point invention for a two-dimensional said underlying sheet is illustrated and referred to in FIG. 1; the two-dimensional said underlying sheet-1 upon which the final results of the invention rests is in registry to the said topmost sheet-2; the said topmost sheet has means for said guidepoints and guidelines, the said grid pattern; the two-dimensional guide, the said topmost sheet, is disposable after its use is completed; this said topmost sheet has means for said registry whenever it is lifted from the said underlying sheet, then to be returned, repositioned in exactly the same position that the said topmost sheet had before it was lifted from the said underlying sheet; these said registry means are positions 3 and 4 on the said topmost sheet to positions 5 and 6, respectively, on the said underlying sheet; the said perforation point-7 provides a means for making holes 13 and 15 through the said topmost sheet, and then goes on to and/or through the said underlying sheet having the said system means having a function for having information flow from said topmost sheet to the said underlying sheet.

Figure 2:
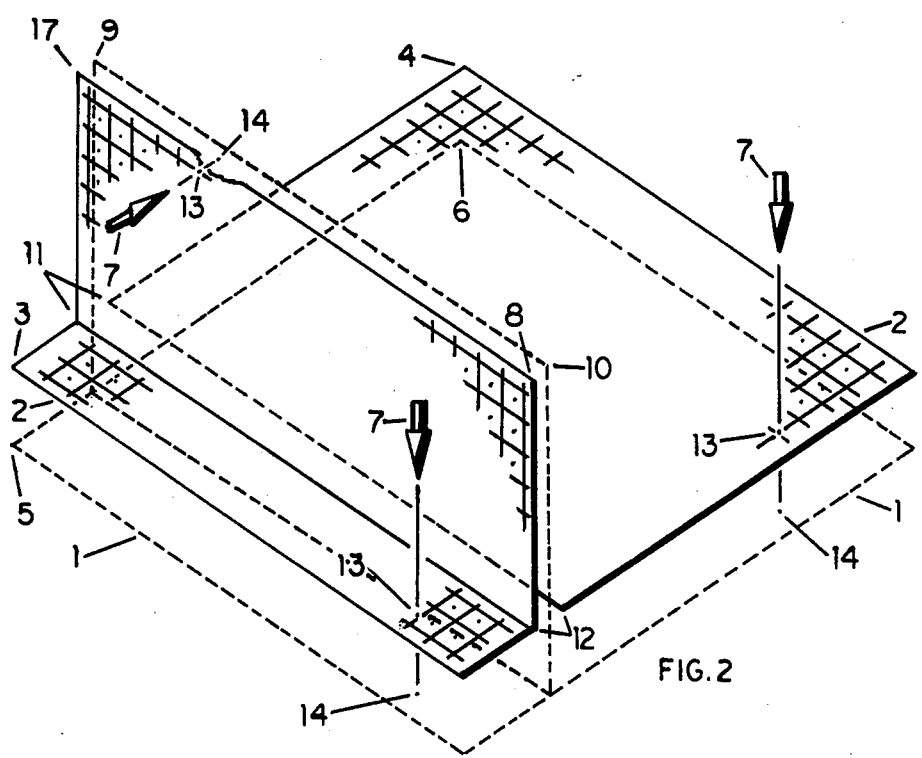
FIG. 2 illustrates an exploded isometric view of a typical invention arrangement for a three-dimensional preliminary recording activity by guide and point.

The preferred structural embodiment for the preliminary recording activity by guide and point invention for a three-dimensional said underlying sheet is illustrated and referred to in FIG. 2; the said underlying sheet-1 is the three-dimensional said underlying sheet upon which the final activity of the invention rests; above said underlying sheet is the three-dimensional said topmost sheet-2; the said topmost guide has means for said guidepoints and guidelines, the said grid pattern; this three-dimensional said topmost sheet is disposable; the DC-GUIDE has means for said registry whenever it is lifted from the said underlying sheet, then to be returned, repositioned in exactly the same position that the said topmost sheet had before it was lifted from the said underlying sheet; these said registry means are positions 3 and 4 on the said topmost sheet to positions 5 and 6, respectively, on the said underlying sheet; also positions 8 and 17 on the said topmost sheet are said registry means to the third dimension of the said underlying sheet at 9 and 10, respectively, as well as the means at positions 11 and 12, which are also said registry means for returning the said topmost sheet to its former three-dimensional position whenever lifted to be returned to the same position exactly; the said perforation point-7 provides means for positioning, said preforation point holes through the said topmost sheet and onto and/or through the said underlying sheet having the said system means having a function for having information flow from said topmost sheet to the said underlying sheet.

DESCRIPTION OF THE PREFERRED OPERATION

Functions Embodiment

The preferred operations and functions embodiment for the preliminary recording activity by guide and point invention for a two- and three-dimensional said underlying sheet is illustrated and referred to in FIG. 1 and FIG. 2; the said perforation point-7 perforates the chosen position-13 which is determined by means of said guidepoints and/or guidelines, the said grid pattern, found on the said topmost sheet-2; through the said topmost sheet whose means and guiding function is to provide the measurements, rough sketch surface, positions for the positioning, perforation point holes on the said underlying sheet, and cleanliness protection for the said underlying sheet; the perforation-14 is continued to, and if required, through the said underlying sheet whose function is to provide the objective upon which rests all of the intermediate and final positioning and indicating activity; the procedure is repeated for positioning, perforation point hole-15 through the said topmost sheet and on to the positioning, perforation point hole-16 positioned on and/or through the said underlying sheet; the said topmost sheet may be lifted and repositioned whenever required; the point hole-14 provides a position on the said underlying sheet, when required; the two points 14 and 16 on the said underlying sheet determine, when required, the length and position of a line 14–16 on the said underlying sheet; the positioning, perforation point hole activity continues until the processing, symbolizing, charting, mapping, layout, drawing, writing, and recording and any other activity requirement utilizing this invention is complete; the said underlying sheet is completed with whatever is required to be added to the said underlying sheet between and among the point holes on and/or in the said underlying sheet after which the said topmost sheet may be detached, disposed, leaving the said underlying sheet having the said system means having a function for having information flow from the said topmost sheet to the said underlying sheet completed and uncovered.

While the above description contains many specifications, these should not be construed as limitations on the scope of the invention, but rather as an exemplification of one preferred embodiment thereof. Many other variations are possible, for example instead of only one said topmost sheet covering the said underlying sheet, there may be two layers, one layer is a said topmost sheet and a second layer is a portion of the said topmost sheet covering and overlaying a portion of the said topmost sheet; thus, one said complete and a part of another said topmost sheet which overlaps the said topmost sheet so that several portions can be point-hole-oriented by several changes of the partial, overlying said topmost sheet, and the said partial topmost sheet may be detached and replaced by another said partial topmost sheet; another embodiment is the said topmost sheet may be in two or more parts, with several means for said register for the several partial said topmost sheets to their original position over the one-pieced and several-pieced said underlying sheets; another embodiment is several said underlying sheets may be positioned under one said topmost sheet with the one said topmost sheet being used over and over with the several said underlying sheets all having either one or several point hole situations or several identical copy said underlying sheet situations; another embodiment is an underlay to the said topmost sheet for selective point holes made by inexperienced users and experienced users of the said topmost sheet and said underlying sheet during rough draft phase activity or note taking. Accordingly, the scope of the invention should be determined not by the embodiment illustrated, but by the appended claims and their legal equivalents.

I claim:
1. A system means for function of recording graphic information in original form and transmitting therefrom only such of said original information as it is desired to preserve for the purpose of upgrading said original information including:
   a topmost sheet, and
   the said topmost sheet adapted to receive said original, graphic information, and
   the said topmost sheet having an opaque structure, and
   means to transfer a selected point of said original graphic 15 information from said topmost sheet to an underlying sheet, and
   the said topmost sheet is used only once for each and any graphic requirement, and
   the said topmost sheet receives a perforation point through 20 the said selected point of graphic information to transfer said selected point from said topmost sheet to said underlying sheet for a unique data transfer,
   whereby said selected point on said underlying sheet can then be modified as desired to effect an upgrading of 25 said original graphic information on said underlying sheet,
   whereby said topmost sheet receives the said perforation point permitting direct data transfer directly toward said underlying sheet from the said topmost sheet thereby having a unique direct data transfer by the perforation point in its throughput space.

2. The said system means as defined in claim 1 in which the said topmost sheet includes a grid of points and/or lines to facilitate the application thereto of said original graphic 35 information.

3. The said system means as defined in claim 1 in which the said topmost sheet and underlying sheet are temporarily attached for registry function and structure only and then detached from each other after the said selected graphic point information is transferred from the said topmost sheet to the said underlying sheet.

4. The said system means for recording said graphic information as defined in claim 1 in which said system means includes a perforation point made by a perforation point making means to transfer the said desired graphic point information from said topmost sheet to said underlying sheet by the perforation point.

5. The said system means as defined in claim 1 in which
   the said underlying sheet is a single sheet, and
   the said underlying sheet receives a perforation point, as required, and
   the said underlying sheet receives modifications to the said perforation point received by the said underlying sheet for the said graphic information.

* * * * *

UNITED STATES PATENT AND TRADEMARK OFFICE
CERTIFICATE OF CORRECTION

PATENT NO. : 4,730,398

DATED : March 15, 1988

INVENTOR(S) : Carl A. Stanton

It is certified that error appears in the above-identified patent and that said Letters Patent is hereby corrected as shown below:

On the Title Page, Item "22" should read -- Nov. 24, 1980 --.

In the Abstract, column 2, lines 5 and 6, "repliminary" should read -- preliminary --.

Column 1, line 48, "said disposable topmost sheet DC-GUIDE; for exam-" should read -- said disposable topmost sheet; for exam- --.

Column 2, lines 60 and 61, "disposable; the DC-GUIDE has means" should read -- disposable; the topmost sheet has means --.

Column 3, line 2, "sheet at 9 and 10, respectively," should read -- sheet at 10 and 9, respectively, --.

Column 4, line 28, "graphic 15 information from said topmost sheet to" should read -- graphic information from said topmost sheet to --.

Column 4, line 33, "through 20 the said selected point of graphic infor-" should read -- through the said selected point of graphic infor- --.

Column 4, line 38, "ing of 25 said original graphic information on said" should read -- ing of said original graphic information on said --.

Column 4, line 48, "original graphic 35 information" should read -- original graphic information --.

UNITED STATES PATENT AND TRADEMARK OFFICE
CERTIFICATE OF CORRECTION

PATENT NO. : 4,730,398
DATED : March 15, 1988
INVENTOR(S) : Carl A. Stanton

It is certified that error appears in the above-identified patent and that said Letters Patent is hereby corrected as shown below:

Column 4, lines 62 and 63, "the said underlying sheet is a single sheet, and the said underlying sheet receives a perforation point," should read -- the said underlying sheet is a single sheet, and the said underlying sheet is blank, and the said underlying sheet receives a perforation point, --.

Signed and Sealed this

Eleventh Day of October, 1988

Attest:

DONALD J. QUIGG

Attesting Officer

Commissioner of Patents and Trademarks